Nov. 6, 1956
F. NETTEL
2,769,618
APPARATUS FOR PROCESSING OF AIR, GAS, VAPORS OR LIQUIDS
Filed Dec. 17, 1953
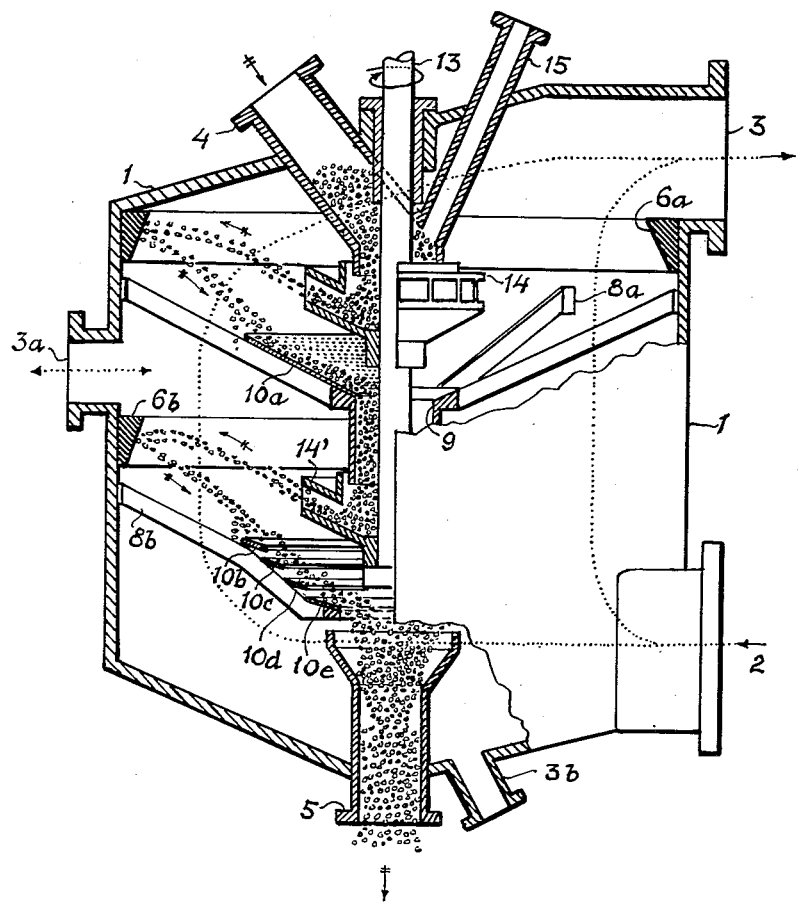
Frederick Nettel.
*INVENTOR.*
BY
*ATTORNEY*

United States Patent Office

2,769,618
Patented Nov. 6, 1956

2,769,618
APPARATUS FOR PROCESSING OF AIR, GAS, VAPORS OR LIQUIDS
Frederick Nettel, Manhasset, N. Y.
Application December 17, 1953, Serial No. 398,696
7 Claims. (Cl. 257—1)

This invention deals with apparatus for processing of air, gas, vapors or liquids, involving the use of granular material as a heat carrier, a cold carrier a drying-, cleaning, condensing- or evaporating agent, or a chemical or catalytic agent. This application is copending with and an extension of the invention shown, described and claimed in my application Serial No. 331,405, for Apparatus for Processing Air, Gas or Vapors, filed January 15, 1953.

The granular material may be of any fineness from pebble size to powder consistency, of any chemical composition including, for example but not by way of limitation, metals, ceramics, carbides, sand, and may or may not enter into chemical reaction with the processed medium or liquid.

It is known to use granular material, which for the purposes of this specification hereafter shall be referred to as "sand" for heating or cooling of gaseous media. The best known of these use sand in fluidized bed form through which the gaseous or vapor medium passes. Fluidization involves, however, substantial pressure losses of the medium which makes it unsuitable for some purposes. In other known coolers or heaters the sand moves by gravity only, which involves difficulties in maintaining regular sand distribution and flow, and leads to large physical dimensions of the apparatus. In known apparatus using stationary beds of granular material it has proved impossible to achieve a uniform distribution of flow of the medium to be processed over the whole bed area, due to what is known as "channeling."

It also is known to evaporate liquids and to condense vapors in apparatus involving the use of tubes for heat or cold transfer. These tubes are susceptible to scale formation, deposits, clogging and corrosion; they are bulky and expensive to build and to maintain.

This invention avoids these defects by providing mechanical means to move the sand across the path of the medium to be processed at substantial velocities, thereby increasing the heat or cold transfer from the sand to said medium or vice versa, or to expose a very large surface of the liquid introduced by wetting the granular material for purpose of cleaning or condensation of gases or vapors, or for evaporation of the liquid into a stream of air or gas.

In the accompanying drawing the single figure shows by way of non-limiting example in a diagrammatic form an embodiment of my invention and its application.

Referring in detail to the drawing I have there shown an apparatus which may be used for any of the purposes indicated above, but which for this description shall be considered as an air heater. 1 denotes a substantially cylindrical shell with an intake opening 2 for the air near the bottom and a discharge opening 3 near the top. There are further provided an upper intake pipe 4 for the hot sand and a discharge pipe 5 for the cooled sand at the bottom of the shell 1. A rebounding ring 6a is provided to fit the inner circumference of the shell. The inner face of the ring is tilted downwardly. Below ring 6a downwardly sloping radial ribs 8a are connected to the shell at their outer ends and at their inner ends to a ring 9. Said ribs support a perforated plate or catcher 10a whose periphery is spaced from the shell. The catcher forms a surface of obtuse conical form, as shown.

Below catcher 10a another rebounding ring 6b is located which in form is identical with ring 6a. Below ring 6b a further catcher is provided. Said second catcher may be of the same form as the catcher 10a or, optionally, may comprise a series of spaced concentric rings 10b, 10c, 10d, 10e, supported by radial ribs 8b.

In the center of the shell 1 a shaft 13 is provided which, during operation of the apparatus, is rotated at predetermined speed by an outside source of power of any known kind (not shown).

Fixed to this shaft are two thrower wheels 14 and 14' which are of a design similar to rotors employed in centrifugal pumps or blowers, with intake for the sand at the top. The upper wheel receives the sand from the pipe 4, while the lower wheel 14' receives it from the opening at the center of the catcher 10a. Another pipe 15 is shown, connecting with pipe 4, the purpose of which will be explained as this specification proceeds.

The operation of the air heater is as follows:

The air to be heated enters at 2 flowing upward in a substantially straight path and out at 3. Hot sand enters through pipe 4 flows as indicated by the double-crossed arrows into the inlet of thrower wheel 14. By rotation of this wheel the sand is accelerated and thrown in a free flight fountain stream across the greater portion of the sectional area of the shell, first against the rebounding ring 6a, from which the sand is reflected in a second free flight stream toward the center of the shell, landing substantially on the foraminous plate or catcher 10a, jumping or rolling over it downward toward its ring 9 and thence into the second thrower wheel 14' where the flow pattern is repeated via the rebounding ring 6b, and a second catcher. The multiple rings of the second catcher function in a similar manner to the openings in the first catcher permitting a portion of the medium to be processed to flow through the spaces between these rings. Heated air is discharged at 3, cool sand at 5.

It is immaterial for the purposes of my invention what particular design is chosen for the two catchers and satisfactory results are secured where either or both are made of solid sheet material, all the medium being processed flowing through the free annular area between the peripheries of the catchers and the shell. From the foregoing and my aforesaid copending application it will be apparent that by forming the catcher means so as to provide one or more upwardly extending passageways having a substantial aggregate area (at least 20% of the cross-sectional area of the shell 1) I provided an axial passageway of low resistance for flow of the fluid medium.

For some purposes it is desired to have air heated to two or more different temperatures. This is achieved by my invention by providing one or more additional openings in the shell in which the heating takes place at a level or levels between the highest and lowest thrower wheels. The air on its way up through the shell has at such points been only partially heated and can be withdrawn through these openings. One such opening 3a is shown. Obviously, if desired, additional air can be introduced through 3a into the shell for heating. When the apparatus is used as a gas cooler, partially cooled gas can be withdrawn through the opening 3a or additional gas can be introduced through it for cooling.

Another pipe 3b is shown at the bottom of the shell. This can be used to discharge surplus water during use of the apparatus as an air or gas cleaner, or condensate when used for condensing vapors.

In the apparatus shown herein since most or all of the medium processed can flow through the shell without even having to pass through the foraminous catcher, the pressure loss of the medium is reduced below that experience in an apparatus such as shown in my copending application.

Obviously, the air to be heated and the sand flow in substantial counterflow, making it possible to transfer the heat from the sand to said air in the most effective manner. This effectiveness is enhanced by the uniform distribution of the free flight sand flow transversely across the axial path of the air. The arrangement further permits a large number of passages of the sand across the air flow within a small shell volume, thus reducing size and cost of the apparatus substantially. Furthermore, the pressure drop of the air flowing through the shell is kept very small which is of vital importance in many applications.

For use of the apparatus as an air-or gas cleaner, sand of ambient temperature may be taken in by pipe 4 while a wetting liquid for the sand, for example water or oil a. s. f. is fed through pipe 15. Impurities in the air or gas are caught when they come in contact with the liquid covering all sand particles, and are carried out with them through pipe 3. Surplus liquid may be carried off by a special pipe such as will be shown in another figure.

For use of the apparatus as a liquid evaporator several modes of operation are possible: Either hot sand is introduced which will heat the liquid and cause it to evaporate, the resulting vapors being carried off by the stream of gas or air flowing upward through the shell, or hot gas or air meets the wetted granular particles thus causing part or all of the liquid to evaporate. It is, of course, also possible to use both hot sand and hot air or gas simultaneously.

For use of the apparatus as a vapor condenser, sand of a temperature lower than the saturation temperature of the vapor is employed. The sand particles, which for this purpose are preferably of small size, act as condensation nuclei and promote it.

Many other applications of my invention, for example, in the chemical and metallurgical industries, in steam power plants and gas turbine plants are possible.

While the time during which the sand is thrown across the path of the medium to be processed is short, the high velocity of the sand increases the heat transfer from or to the sand. To obtain satisfactory rebound of the sand toward the centrally located slanted screens or sieves or solid sheets, it is advantageous to throw the sand in a radial direction toward the rebounding rings. This is achieved, as known from the art of centrifugal pumps, by providing the thrower wheels with radial blades bent backwards against the direction of wheel rotation.

It is within the scope of my invention to use for the rebounding rings material of higher abrasion resistance than that of the sand because it is generally easier and cheaper to replace the sand than to renew these parts.

It is immaterial for the purposes of my invention what kind of sand is used, whether it consists of one kind of material or a mixture of different materials, and whether or not it enters into chemical action with the processed medium or the liquid introduced in the shells, or whether it acts as a catalyst or radiation carrier. At present I consider sand consisting substantially of aluminum as preferred material for heat exchangers, due to its high heat conductivity.

Having now described and illustrated my invention, I wish it to be understood that my invention is not to be limited to the specific form or arrangement of parts herein described and shown, or specifically covered by my claims.

I claim:

1. An apparatus for processing a medium such as air, gas or vapor using granular material for said processing, said apparatus comprising a closed shell having a substantially vertical axis, said shell having an inlet opening near the bottom and an outlet opening at the top for the medium, an inlet conduit at the top and an outlet conduit at the bottom of said shell for said granular material, a multiplicity of vertically stacked thrower wheel means mounted to rotate about a common vertical axis within and centrally of said shell, the uppermost thrower wheel means being disposed to receive said granular material from said inlet conduit, said thrower wheel means being arranged to throw said granular material upwardly and outwardly from the center part of said shell in free flight streams to its circumference, means to rotate said thrower wheel means, a multiplicity of stationary, slanted catcher means, each catcher means being located beneath a different thrower wheel means and being disposed to receive granular material after it has been thrown by the thrower wheel means directly above it in a free flight stream to the circumference of the shell and has rebounded therefrom in another free flight stream toward said catcher means so that the catcher means will guide said granular material back toward the center part of said shell below said thrower wheel means by gravity, the peripheries of said catcher means and the peripheries of said thrower wheel means being remote from the shell, each said catcher means including a center portion, the center portions of all said catcher means except the lowest, collecting the granular material and guiding it to the next lower thrower means, the central portion of the lowermost catcher means collecting the granular material and guiding it to said outlet conduit, the outlet opening for the medium being disposed above and at least in part radially inwardly of the part of the shell struck by the granular material flung from the uppermost thrower wheel means, said shell, thrower wheel means and catcher means providing in the shell a vertical annular passageway of substantial cross-sectional area for the medium, said passageway extending upwardly through the radially flowing free flight outward and return streams of the granular material and being located radially outwardly of the thrower wheel means and catcher means, the flow of said granular material and of the medium being substantially in counter-flow.

2. An apparatus as set forth in claim 1 wherein the shell includes annular rebounding surfaces disposed along the circumference of the shell to be struck by the granular material flung from the thrower wheel means and travelling in free flight streams toward the shell circumference, said rebounding surface means redirecting said granular material in free flight streams toward the catcher means beneath each of said thrower wheel means.

3. An apparatus as set forth in claim 2 wherein the thrower wheel means is provided with radial blades shaped to impart to the granular material a velocity substantially in a radial direction from the center of the shell to its circumference.

4. An apparatus as set forth in claim 1 wherein there is provided a second conduit means connected to the inlet conduit for the granular material for feeding a liquid into the shell simultaneously with the granular material.

5. An apparatus as set forth in claim 1 wherein there is provided an additional conduit at the bottom of the shell for discharging liquid therefrom.

6. An apparatus as set forth in claim 1 wherein there is provided an additional opening in the shell located at an intermediate level between the highest and the lowest thrower wheel means for withdrawing a portion of the medium from said shell or for introducing an additional medium into said shell for processing.

7. An apparatus as set forth in claim 1 wherein the granular material consists substantially of aluminum.

References Cited in the file of this patent

UNITED STATES PATENTS

| | | |
|---|---|---|
| 1,590,798 | Barker | June 29, 1926 |
| 1,653,332 | Baechler | Dec. 20, 1927 |
| 2,254,867 | Bonotto | Sept. 2, 1941 |
| 2,443,210 | Upham | June 15, 1948 |